(12) United States Patent
Jung et al.

(10) Patent No.: US 6,937,851 B2
(45) Date of Patent: *Aug. 30, 2005

(54) METHOD FOR PROCESSING AUTHENTICATION FAILED/ AUTHORIZATION DENIED SUBSCRIBERS BY INTELLIGENT NETWORK

(75) Inventors: Yoon-Taek Jung, Kyungki-Do (KR); Sung-Kyun Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 678 days.

This patent is subject to a terminal disclaimer.

(21) Appl. No.: 09/750,909

(22) Filed: Jan. 2, 2001

(65) Prior Publication Data

US 2001/0025345 A1 Sep. 27, 2001

(30) Foreign Application Priority Data

Dec. 30, 1999 (KR) .......................... 1999/65894

(51) Int. Cl.⁷ ................................. H04M 1/66
(52) U.S. Cl. .................. 455/410; 455/411; 455/417; 455/445
(58) Field of Search ................. 455/411, 412, 455/408, 415, 425, 433; 379/114.1, 112, 59, 189; 340/825

(56) References Cited

U.S. PATENT DOCUMENTS

| | | | | |
|---|---|---|---|---|
| 5,510,777 A | * | 4/1996 | Pilc et al. ............... | 340/5.27 |
| 5,517,555 A | * | 5/1996 | Amadon et al. ........... | 455/408 |
| 5,579,379 A | * | 11/1996 | D'Amico et al. ........ | 379/114.01 |
| 5,913,162 A | * | 6/1999 | Gourdin et al. ............ | 455/424 |
| 6,029,062 A | * | 2/2000 | Hanson .................... | 455/408 |
| 6,157,707 A | * | 12/2000 | Baulier et al. ............ | 379/189 |
| 6,192,237 B1 | * | 2/2001 | Clapton et al. .......... | 455/422.1 |
| 6,253,081 B1 | * | 6/2001 | Koster ..................... | 455/433 |
| 6,266,526 B1 | * | 7/2001 | Kim ........................ | 455/411 |
| 6,496,691 B1 | * | 12/2002 | Easley et al. ............. | 455/415 |

FOREIGN PATENT DOCUMENTS

| | | | | |
|---|---|---|---|---|
| EP | 0534673 A2 | 3/1993 | ............ | 93/13 |
| WO | WO 96/36194 | 11/1996 | ............. | 7/38 |

OTHER PUBLICATIONS

International Search Report dated Sep. 13, 1996.

* cited by examiner

Primary Examiner—Temica Beamer
(74) Attorney, Agent, or Firm—Fleshner & Kim, LLP

(57) ABSTRACT

A method for processing an authentication failed/ authorization denied subscribers by intelligent network is disclosed in which when a call originated by a subscriber is authentication-failed or authorization-denied in a communication service network, a phone communication is connected to a service center or to a phone number designated by the subscriber of the corresponding terminal, or connected to a special service equipment such as an Intelligent Peripheral (IP), or is processed as a normal call. The identity of the subscriber can thus be recognized, and the subscriber's legitimacy can be determined. Additionally, various announcements, suitable to certain situations can be provided, or a normal call service can be provided to the subscriber. Additionally, communication between the subscriber and a person in charge of the subscriber in a service center can be established. A call of a subscriber that has been authentication-failed and authorization-denied is automatically traced and its history is automatically maintained.

17 Claims, 14 Drawing Sheets

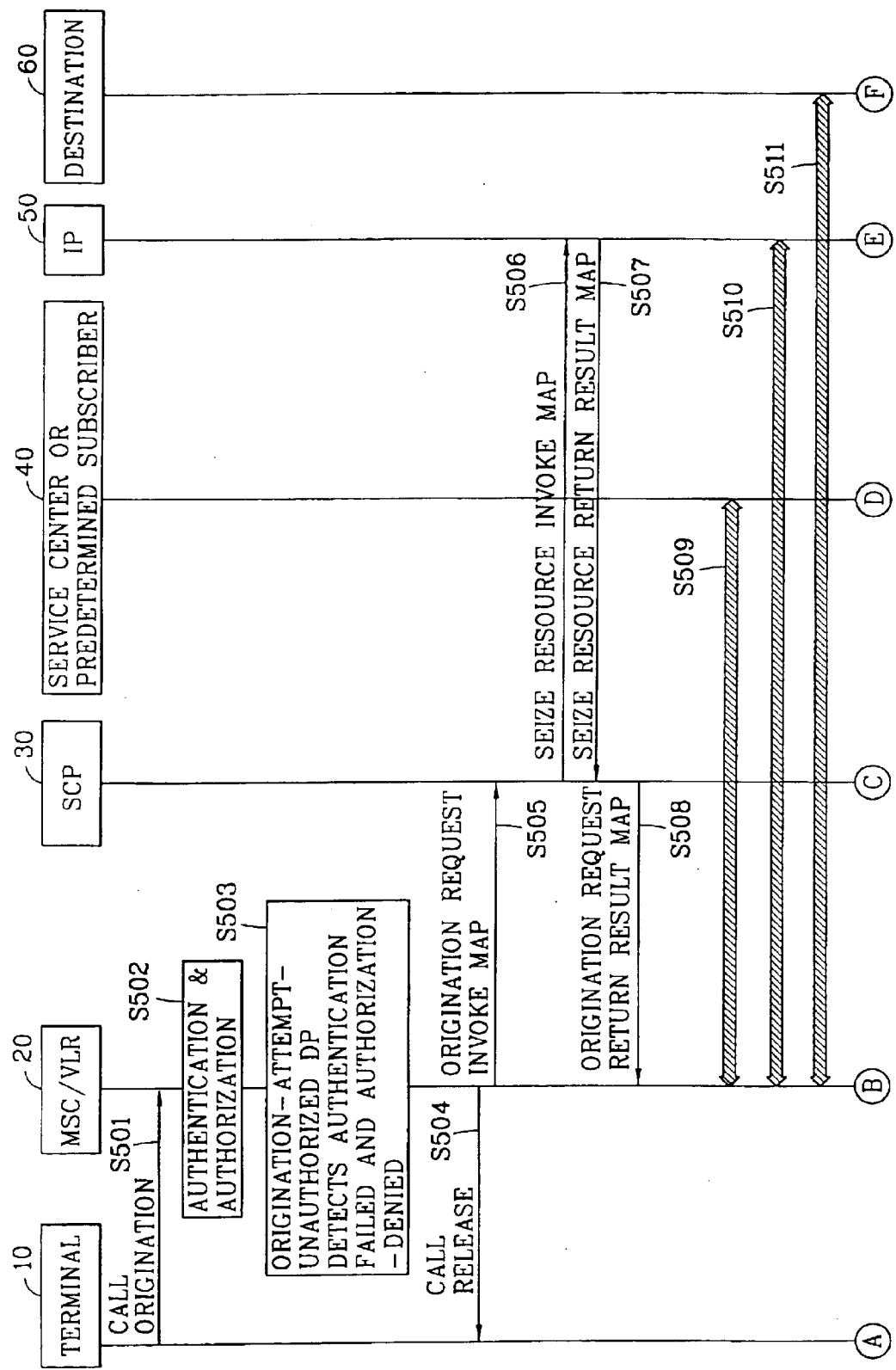

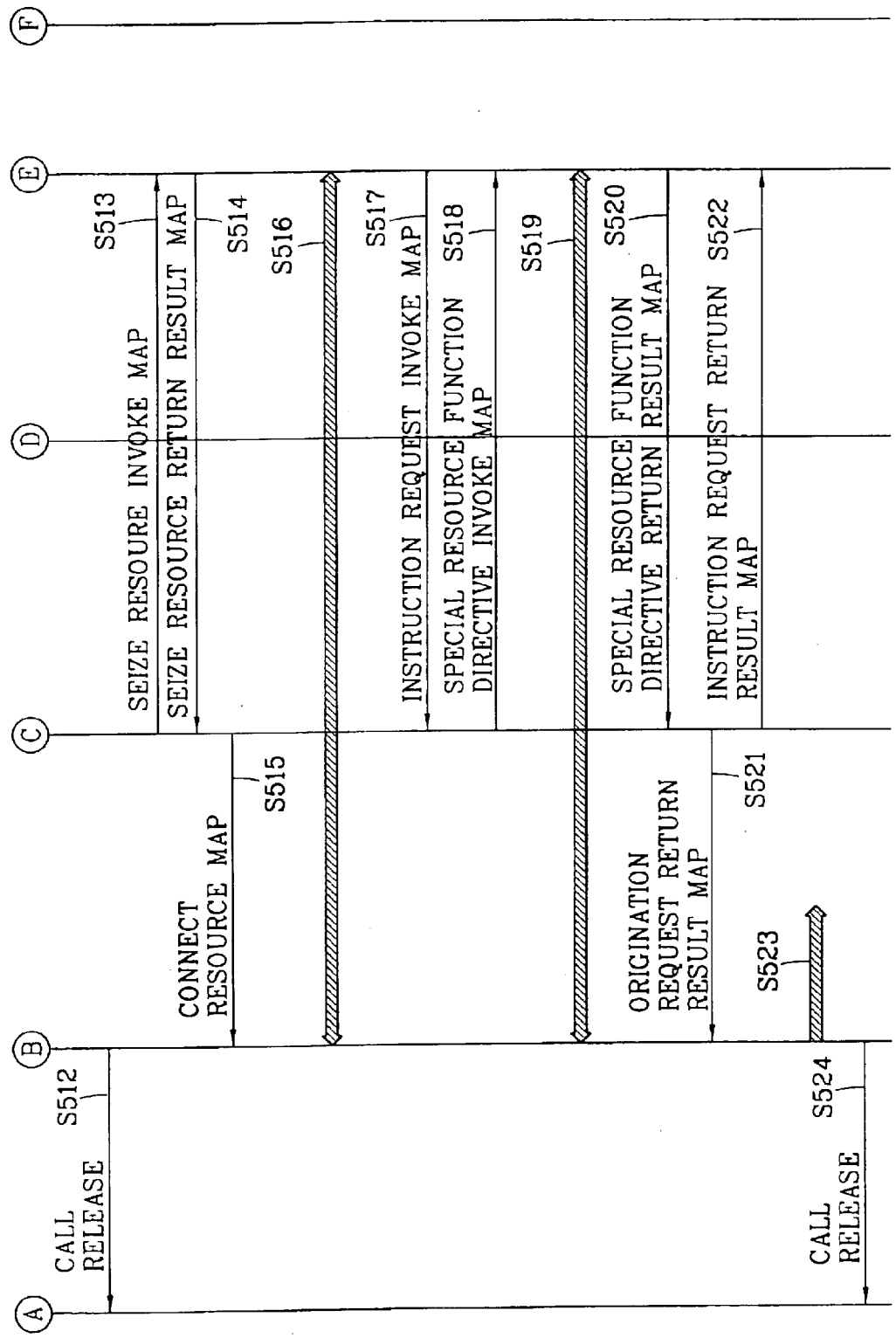

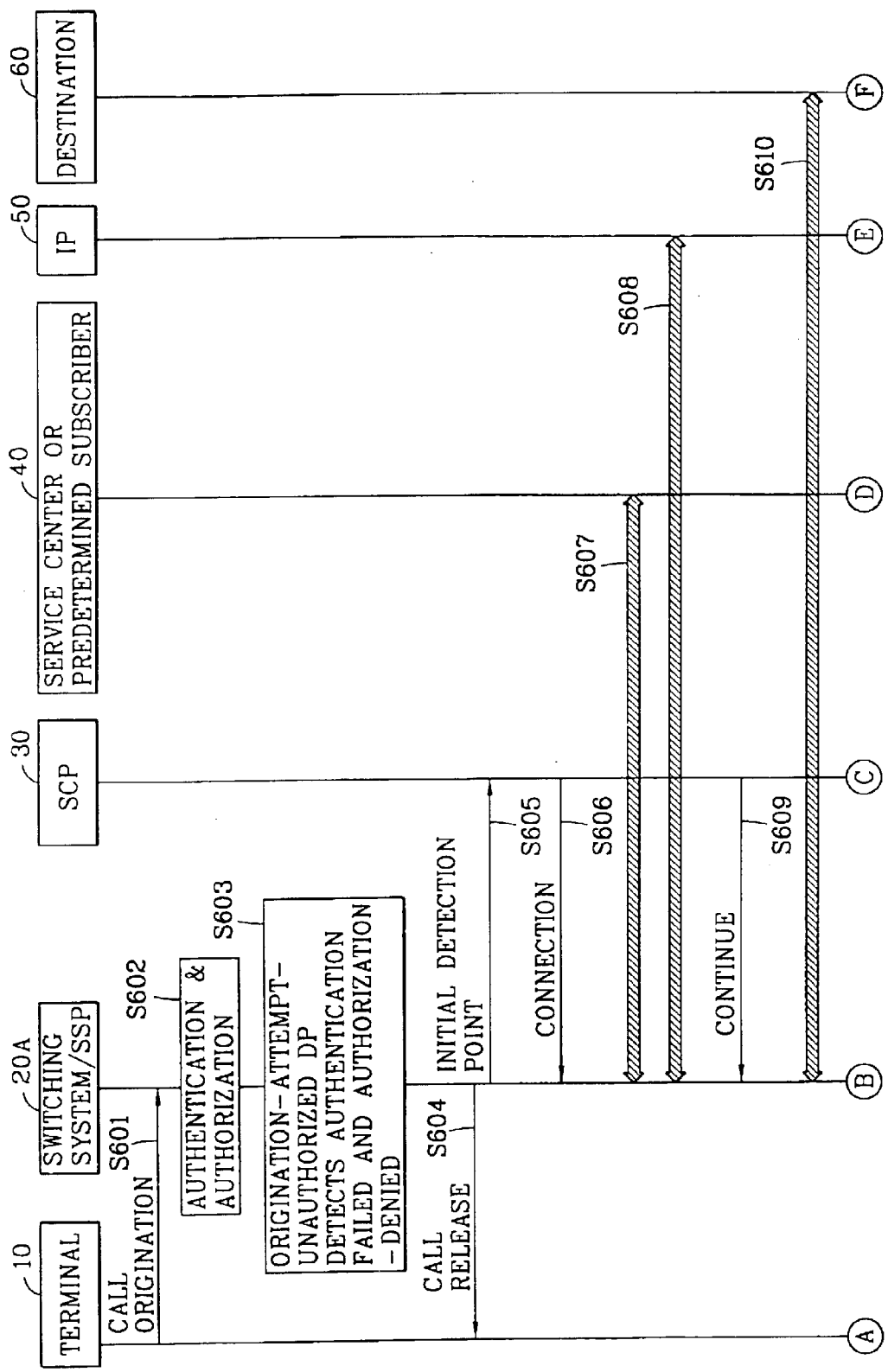

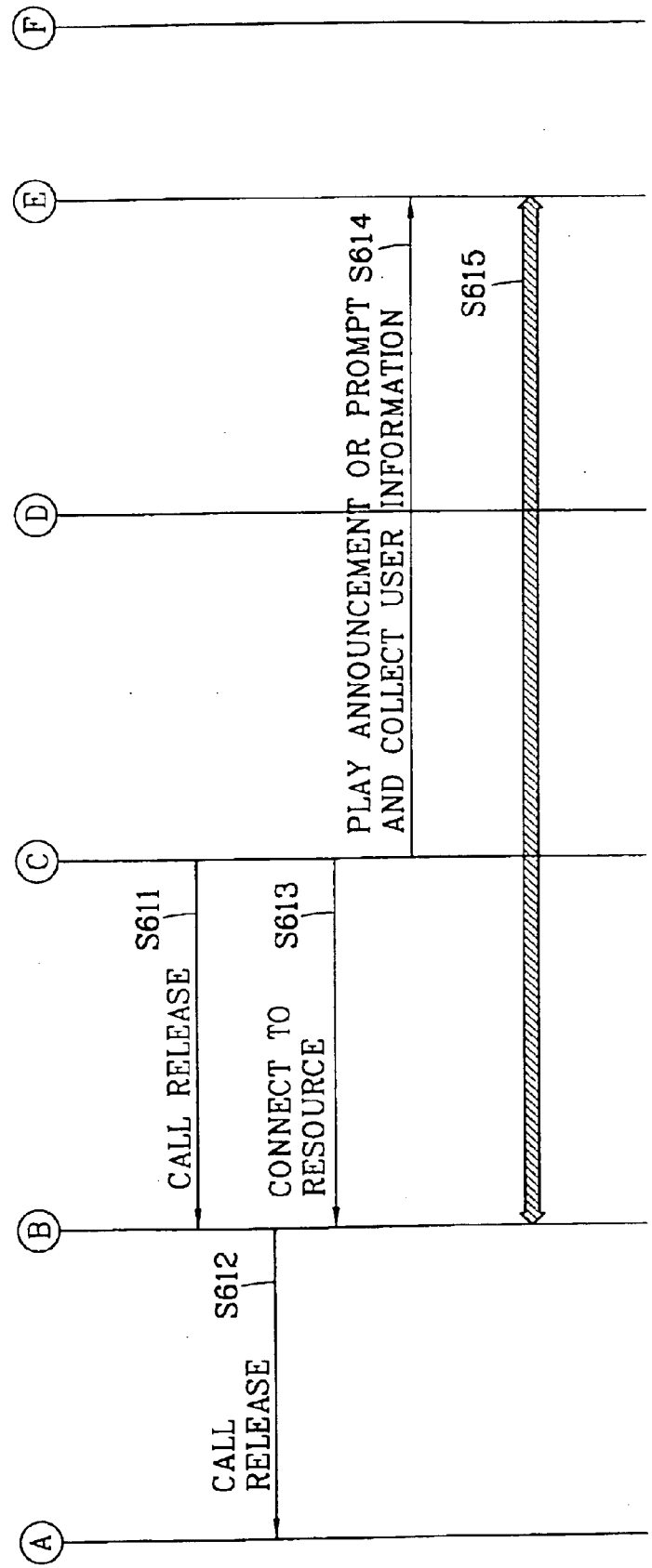

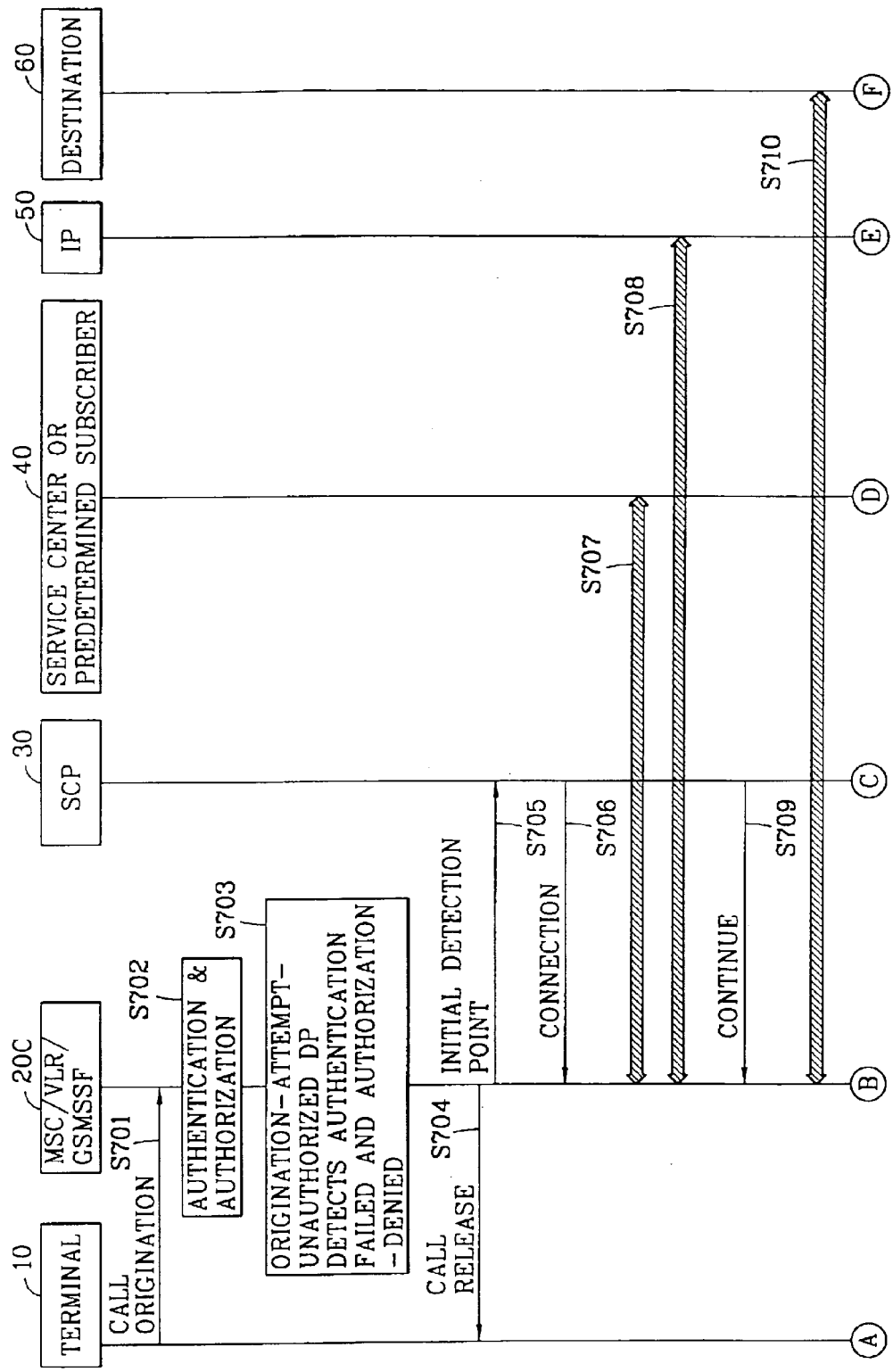

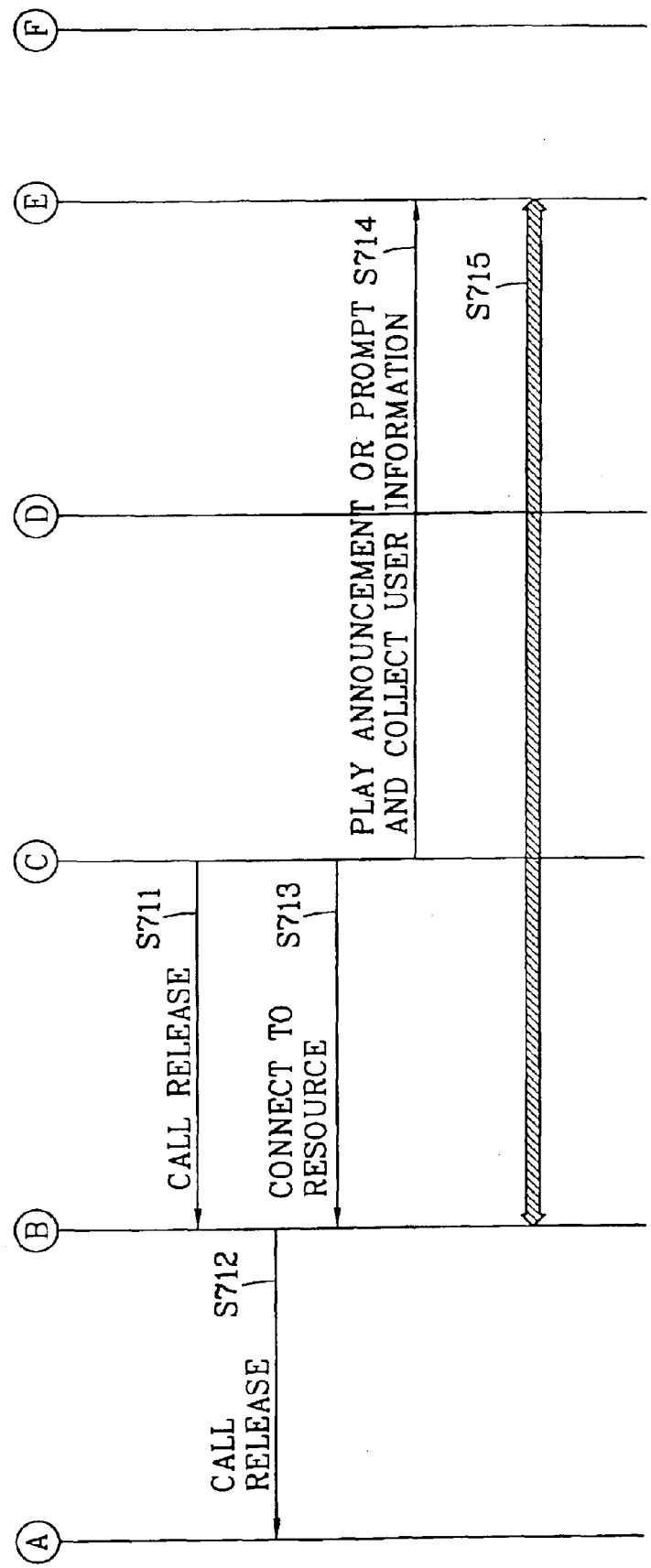

METHOD FOR PROCESSING AUTHENTICATION FAILED/ AUTHORIZATION DENIED SUBSCRIBERS BY INTELLIGENT NETWORK

BACKGROUND OF THE INVENTION

1. Field of the Invention

The present invention relates to an intelligent network, and more particularly to a method for processing authentication failed/authorization denied subscribers by intelligent network.

2. Background of the Related Art

A communication service network typically uses an authentication function to confirm the legitimacy of a subscriber, as well as an authorization function for the subscriber for suspending the authorization of the subscriber over when a lost terminal is used or if payment for a service fee has not been made.

In case of a mobile communication service network, since a terminal is physically separated from the network, there is a high possibility that the terminal will be lost or stolen, or that a stranger illegally duplicates a terminal of a legitimate subscriber for illegal use.

In an effort to solve such problems, in the mobile communication service network, the authentication function and the authorization denial function have been positively and actively introduced for the subscriber when he or she requests origination of a call.

However, when authentication for the terminal which attempts a call origination fails, it is necessary to take an appropriate step to identify the person who is using the terminal and to judge his or her legitimacy.

Even when a terminal for which authorization has been denied as having been lost or stolen is still used, it is necessary to identify the person using the terminal to take an appropriate step.

Also, even when the subscriber is subject to an authorization denial due to a delay in payment for service fee, it is necessary to first provide a normal call service together with a proper announcement for a certain period of time to inform the person of expected suspension of the service, or make a phone call to a person in charge of the subscriber of the service network to lead him or her toward a normal service.

Further, when the authentication of the subscriber fails or the authorization of the subscriber is denied for some reason, an appropriate announcement or a normal call service should be provided to the subscriber depending on situations.

In addition, even though the subscriber is qualified, the authentication may fail for some reason. In this case, normal service should be provided immediately to the corresponding subscriber.

In the related art communication service network, when subscriber authentication fails or is denied for an attempted call, the service for the corresponding subscriber is unconditionally disconnected. It thus becomes difficult to identify the corresponding subscriber, judge his or her legitimacy, provide an announcement depending on situations or provide a normal call service. It is also difficult to lead to a normal service, through a communication with the corresponding subscriber or the person in charge of the subscriber in the service center.

FIG. 1 illustrates a related art method for processing a call originated by a subscriber for whom authentication has failed or been denied in a communication network service.

As shown in the drawing, when a subscriber terminal 1, including information on its own terminal, attempts to originate a call to MSC/VLR or to a switching system/SSF2 (S10), the MSC/VLR or the switching system/SSF analyzes the information of the terminal that attempted the call origination to determine whether it has been authenticated and authorized (S11).

If the call origination is from a rightful terminal, the MSC/VLR or the switching system/SSF analyzes a phone number of the called party and attempts to set up a call. If, however, the call origination is determined to have been received from an authentication-failed terminal or from an authorization-denied terminal, a simple announcement message provided from the switching system 2 is transmitted to the terminal 1 that attempted the call origination and immediately releases the service for the corresponding call.

The service for the authentication-failed or authorization-denied subscriber is also made in the same way in an intelligent network, which will now be described with reference to FIG. 2.

FIG. 2 is a flow chart of a BCSM (Basic Call State Model) for processing an originated call as defined by a North American wireless standard mobile communication intelligent network (Wireless Intelligent Network (WIN)) standard in accordance with the related art.

As shown in FIG. 2, when a Point In Call (PIC1) detects a call originated from a terminal, the corresponding PIC1 performs an event processing for the detected call and shifts to the next stage for an intelligent network service.

A Point In Call 2 (PIC2) performs an authenticating procedure and checks its authorization to determine whether the call has been received from a normal subscriber terminal. If the call is determined to have been received from a normal subscriber terminal and thus authentication and authorization are given thereto, it shifts to the next stage.

A Point In Call 3 (PIC3) collects initial information included in the corresponding originated call, that is, a service code, a telephone exchange number, and a called party number. If the time allocated for collecting information elapses, an exceptional process is performed to return to an initial routine. If, however, the information for the originated call is normally collected within a pre-set time period, it shifts to the next stage.

After a detection point process is performed on the information collected by a third detection point (DP3), the collected information is analyzed by a PIC4.

If the analyzed information is invalid to set up a call, the information is processed as an exceptional case and returns to the initial routine. When analysis for information on a valid originated call is completed, it shifts to the next stage.

After a detection point process on the information analyzed by a fourth detection point (DP4) is performed, a route desired to set up a call is selected by a Point In Call 5 (PIC5) and a set-up processing to set up a call is performed for the authenticated call through the route selected by a PIC6.

If a failure occurs in the route selected by the PIC6 and is detected by a fifth detection point (DP5), an exceptional process is performed to return to the initial routine. Meanwhile, if a failure occurs in set-up processing for the authenticated signal, the exceptional process is performed to return to the initial routine.

If the call is set-up normally, a call to a corresponding destination is made by a Point In Call 7 (PIC7). Then, a routine in which a ring back tone is transferred and a destination response awaits is performed by a PIC8. Next, a routine in which the originated call is activated is performed by a PIC9, and a routine in which the originated call is suspended is performed by a PIC10.

If a failure is detected in a routine of each PIC, an exceptional processing routine is performed for the corresponding processing operation, and the process returns to the initial routine, and if suspension of the originated call is detected, the process returns to the initial routine.

If PIC2 fails authentication or denies the authorization for the originated call detected by the first detection point (DP1), the call service is suspended, and an exceptional process is performed and returns to the initial routine.

FIG. 3 is a flow chart of a related art BCSM (Basic Call State Model) for processing an originated call according to a ITU-T standard in an intelligent network.

As shown in FIG. 3, when a point in call 21 (PIC21) detects a call originated from a terminal, the PIC21 performs an event processing for the detected call and shifts the process to the next stage for an intelligent network service.

A Point In Call 22 (PIC22) perform an authenticating procedure and checks its authorization to determine whether the call has received from a normal subscriber terminal. If the call is determined to have been received from a normal subscriber terminal and authentication and authorization are given, the PIC22 shifts the process to the next stage.

A Point In Call 23 (PIC23) collects initial information included in the corresponding originated call, that is, a service code, a telephone exchange number, and a destination number. If the time allocated for collecting information elapses, an exceptional process is performed to return to an initial routine. If, however, the PIC23 normally collects information within a pre-set time period, the process shifts to the next stage.

After a detection point process is performed on the information collected by a third detection point (DP23), the collected information is analyzed by a PIC24. If the analyzed information is invalid to set up a call, the information is processed as an exceptional case, and returns to the initial routine. After analysis of information on a valid originated call is completed, the process shifts to the next stage.

After a detection point process on the information analyzed by a fourth detection point (DP24) is performed, a route desired to set up a call is selected by a Point In Call (PIC25), and a set-up processing to set up a call is performed for the authenticated call through the route selected by a Point In Call 26 (PIC26).

If a fifth detection point (DP25) detects a failure in the route selected by the PIC26, an exceptional process is performed to return to the initial routine. Meanwhile, a failure occurs in set-up processing for the authenticated signal, the exceptional process is performed to return to the initial routine.

If the call set-up is normally performed, a call to a corresponding destination is made by a Point In Call 27 (PIC27). Then, a routine in which a ring back tone is transferred and a destination response awaits is performed by a PIC28. Next, a routine in which the originated call is activated is performed by a PIC29, and a routine in which the originated call is suspended is performed by a PIC30.

If a failure is detected in a routine of each Point In Call (PIC), an exceptional processing routine is performed for the corresponding processing operation and the process returns to the initial routine. If suspension of the originated call is detected, the process returns to the initial routine.

If the PIC22 fails authentication or denies the authorization for the originated call detected by the first detection point (DP21), call service is suspended and an exceptional process is performed and returns to the initial routine.

An attempted call defined in an intelligent network of a GSM/UMTS (Global System for Mobile/Universal Mobile Telecommunications System), and especially, in a CAMEL (Customized Applications for Mobile network Enhanced Logic) will now be described.

FIG. 4 is a flow chart of a related art BCSM basic Call State Model) showing a process of an originated call which is applied to an intelligent network of GSM/UMTS (for example a CAMEL standard).

As shown in FIG. 4, when an event for an originated call is detected by a Point In Call (PIC41), PIC41 detects authentication and authorization of the call and its initial information and requests analysis of the information for processing the call.

After a detection point process is performed on the information collected by a first detection point (DP41), the information collected for the call is analyzed by a Point In Call (PIC42). If the analyzed information is invalid, the information is processed as an exceptional case, and the process returns to the initial routine. Meanwhile, if the analyzed information is determined to be valid, the process shifts to the next stage.

After a fourth detection point (DP42) performs a detection point process on the information analyzed, a Point In Call 43 (PIC43) selects a route for setting up a call and sets up a call set-up message.

If a failure is detected in the route selected by the third detection point DP43, or it is detected that the route selected by a fourth detection point DP44 is in use, or if no response is detected for the call set-up message through the route selected by a fifth detection point DP45, an exceptional process is performed to return to the initial routine. If a call is set up through the selected route, however, the Point In Call (PIC44) activates the call.

The related art mobile communication network has various problems. For example, an authentication and authorization is analyzed for a terminal which attempts to originate call. If, based on the analysis, the terminal is determined to be disqualified or its authentication fails for some reason, service is unconditionally disconnected with the call originated from the terminal. This result in problems that the corresponding subscriber is not identified, it is hard to judge legitimacy of the corresponding terminal, and a proper measure is not able to be taken for the corresponding terminal.

Additionally, the unconditional disconnecting of the service disadvantageously prohibits the guiding the subscriber who has delayed payment of a service fee to pay and inducing him or her to a normal subscriber.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a method for processing authentication failed/authorization denied subscribers by an intelligent network, which substantially obviates problems caused by limitations and disadvantages in the related art.

Another object of the present invention is to provide a method for processing authentication failed/authorization denied subscribers by an intelligent network in which if authentication of a call originated by a subscriber fails, or if authorization is denied in a communication service network, a phone communication is connected to a service center or to a phone number designated by the subscriber of the corresponding terminal.

Another object of the present invention is to provide a method for processing authentication failed/authorization denied subscribers by an intelligent network wherein if authorization is denied in a communication service network, a phone communication is connected to a special service equipment such as an IP (Intelligent Peripheral).

Another object of the present invention is to provide a method for processing authentication failed/authorization denied subscribers by an intelligent network wherein if authorization is denied in a communication service network, the call is processed as a normal one.

Another object of the present invention is to provide a method for processing authentication failed/authorization denied subscribers by an intelligent network wherein if authorization is denied in a communication service network, the identity of the subscriber is recognized, and the subscriber's legitimacy is determined.

Another object of the present invention is to provide a method for processing authentication failed/authorization denied subscribers by an intelligent network wherein if authorization is denied in a communication service network, various announcements suitable to corresponding situations are provided, or a normal call service is provided to the subscriber.

Another object of the present invention is to provide a method for processing authentication failed/authorization denied subscribers by an intelligent network wherein if authorization is denied in a communication service network, communication is established between the subscriber and a person in charge of the subscriber in a service center, thereby inducing the subscriber toward a normal service.

Another object of the present invention is to provide a method for processing authentication failed/authorization denied subscribers by an intelligent network wherein if authorization is denied in a communication service network, a call of a subscriber that has been authentication-failed and authorization-denied is automatically traced and its history is automatically maintained, and various steps and services are prepared to be provided by a communication service network provider to the authentication-failed and authorization-denied subscriber, to suitably handle the situations.

To achieve at least these advantages, in whole or in parts, there is provided a method for processing authentication failed/authorization denied subscribers by intelligent network including an Origination__Attempt__Unauthorized detection point for performing a corresponding processing operation according to an instruction of an SCP (Service Control Point) in case that a subscriber who attempts to originate a call in an intelligent network service is authentication-failed or authorization-denied.

To achieve at least these advantages in whole or in parts, there is further provided a method for processing authentication failed/authorization denied subscribers by intelligent network comprising a step in which an Origination__Attempt__Unauthorized detection point detects an authentication failure or authorization denial for a subscriber who has originated a call and informs an SCP of the corresponding fact; a step in which the SCP instructs that the call originated by the subscriber is connected to a predetermined location; and a step in which the subscriber whose call has been authentication-failed or authorization-denied is induced to a normal service according to the instruction of the SCP.

To achieve at least these advantages in whole or in parts, there is further provided a method for processing authentication failed/authorization denied subscribers by intelligent network including the steps of analyzing the authentication and authorization of a subscriber who originated a call when the call is detected by a mobile switching system; judging whether an authorization failure trigger is in a state of activation in case that the subscriber is authorization-denied; releasing the call according to a procedure defined in the switching system in case that the authorization denial trigger is in a state of non-activation, or transferring an Origination Request INVOKE message, in case of an intelligent network of a North American wireless standard, including a parameter indicating the reason for the authentication failure or the authorization denial against the subscriber and location information of the subscriber, or an initial detection point message, in case of an intelligent network of an ITU or a GSM/UMTS, to an SCP which handles the corresponding trigger, in case that the authorization denial trigger is in a state of activation; transmitting an origination request return result message or a connection message for connecting the call originated by the subscriber to a predetermined location, to the switching system according to analysis of the origination request message or the initial detection point message; and connecting the call originated by the subscriber to a corresponding location according to the origination request return result message or the connection message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 9A and 9B are a flow chart of a call connection service between a terminal and a switching system where an originated call is subject to an authentication failure or an authorization denial in the communication network service of the WIN standard in accordance with a preferred embodiment of the present invention;

FIGS. 10A and 10B are a flow chart illustrating a call connection service between a terminal and a switching system where an originated call is subject to an authentication failure or an authorization denial in the communication network service of the ITU-T standard in accordance with a preferred embodiment of the present invention; and FIGS. 11A and 11B are a flow chart illustrating a call connection service between a terminal and a switching system in case that an originated call is subject to an authentication failure or an authorization denial in the communication network service of the CAMEL standard in accordance with the present invention;

DETAILED DESCRIPTION OF PREFERRED EMBODIMENTS

Figure 1:
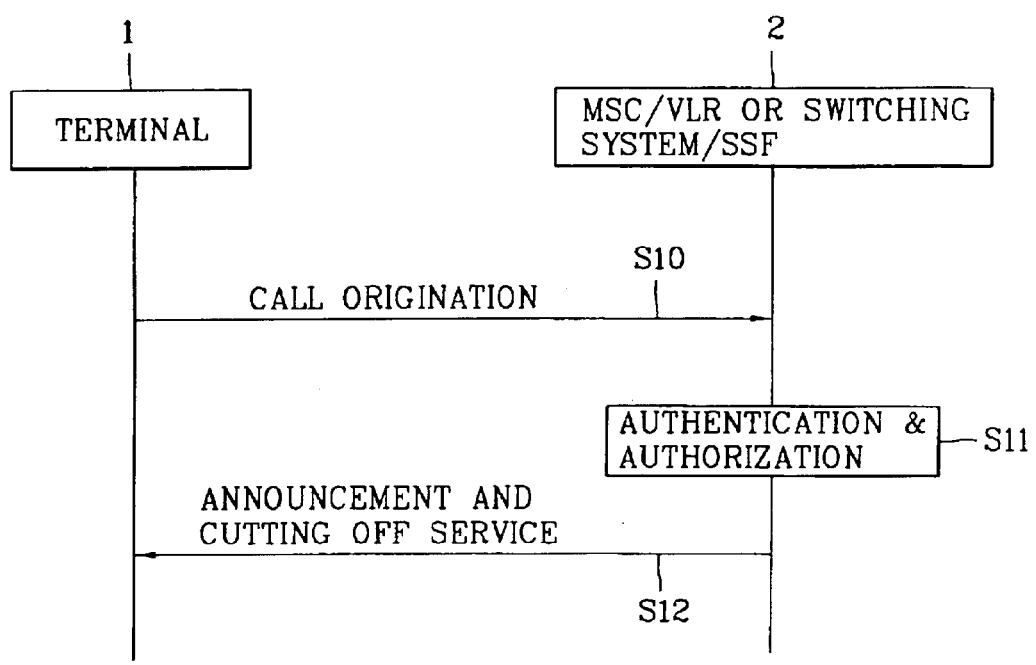
FIG. 1 is a schematic view showing a related art method for processing a call origination of a subscriber for whom authentication has failed or for whom authorization is denied in a communication network service.
Figure 2:
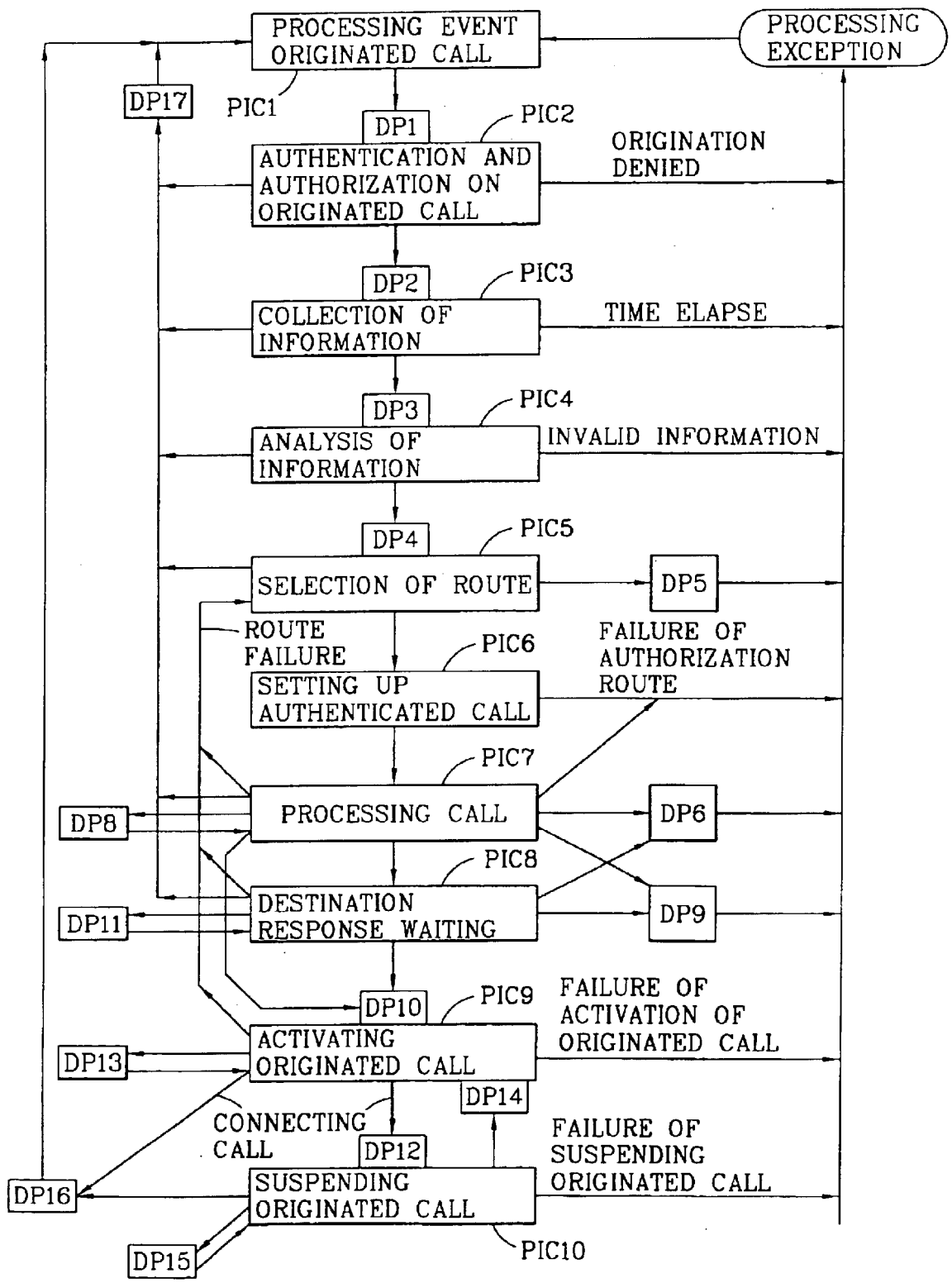
FIG. 2 is a flow chart illustrating a related art BCSM (Basic Call State Model) showing a process of an originated call according to a WIN (Wireless Intelligent Network) standard in an intelligent network.
Figure 3:
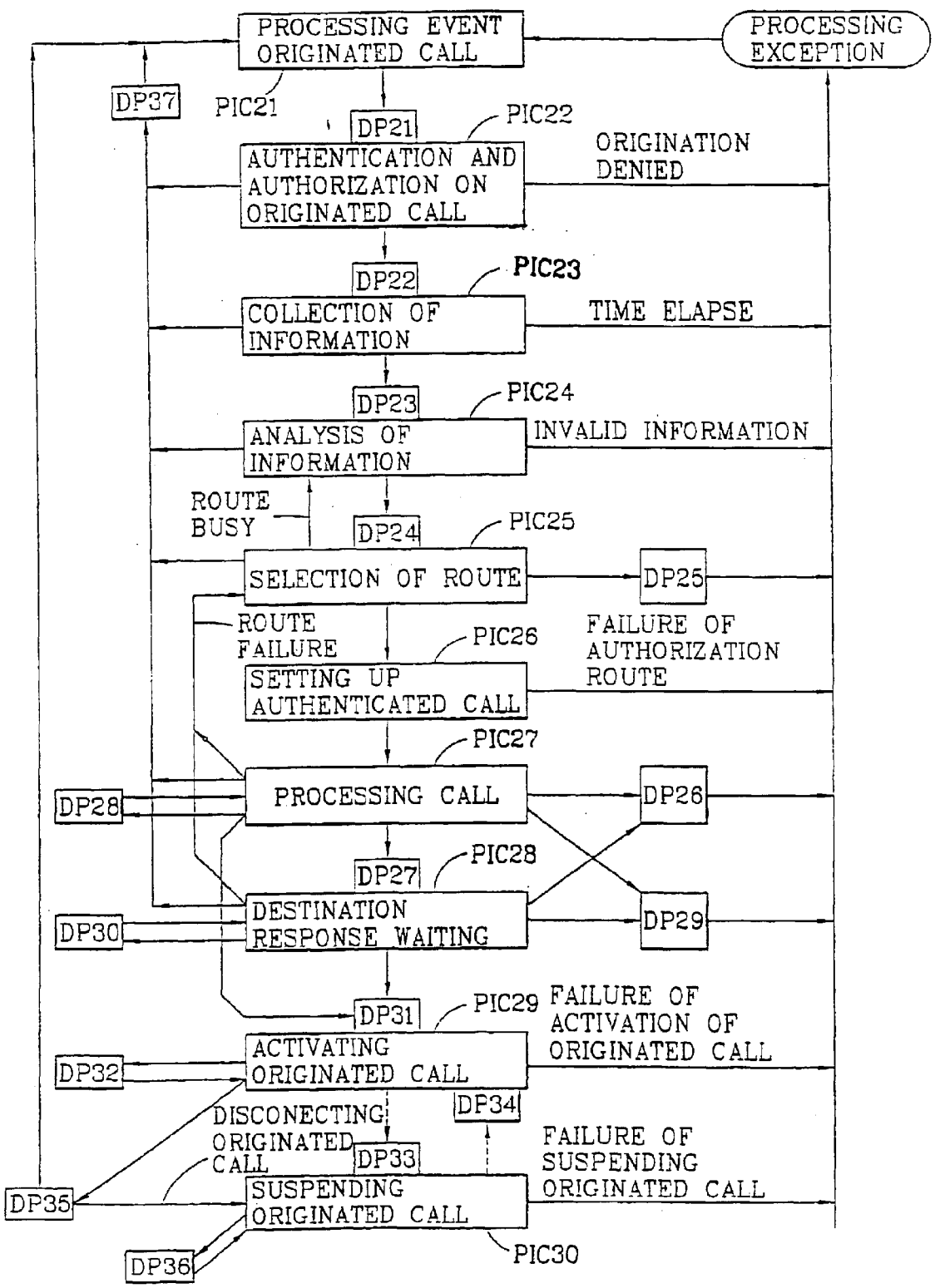
FIG. 3 is a flow chart illustrating a related art BCSM (Basic Call State Model) showing a process of an originated call according to a ITU-T standard in an intelligent network.
Figure 4:
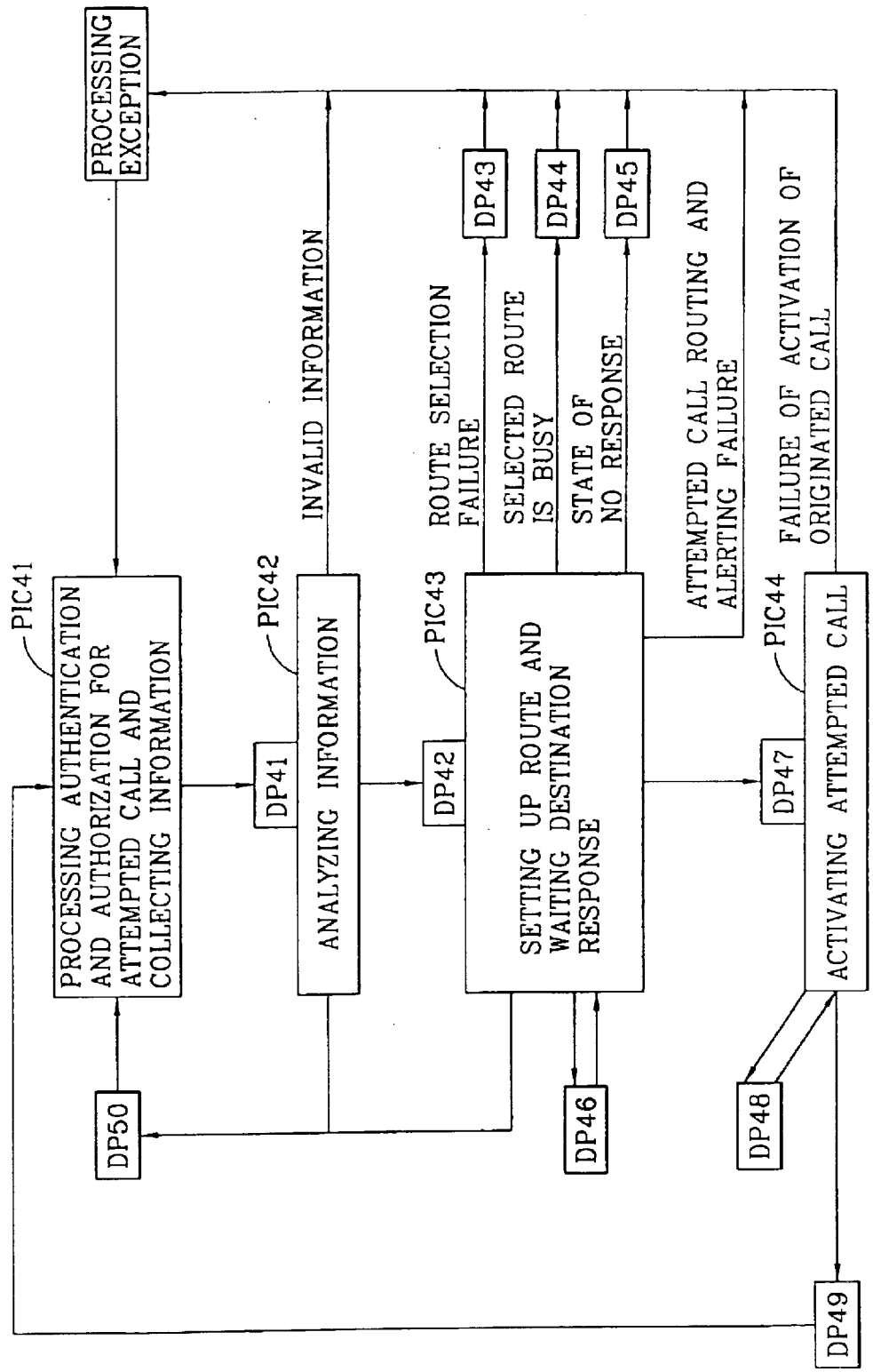
FIG. 4 is a flow chart illustrating a related art related art BCSM (Basic Call State Model) showing a process of an originated call according to a CAMEL standard in an intelligent network.
Figure 5:
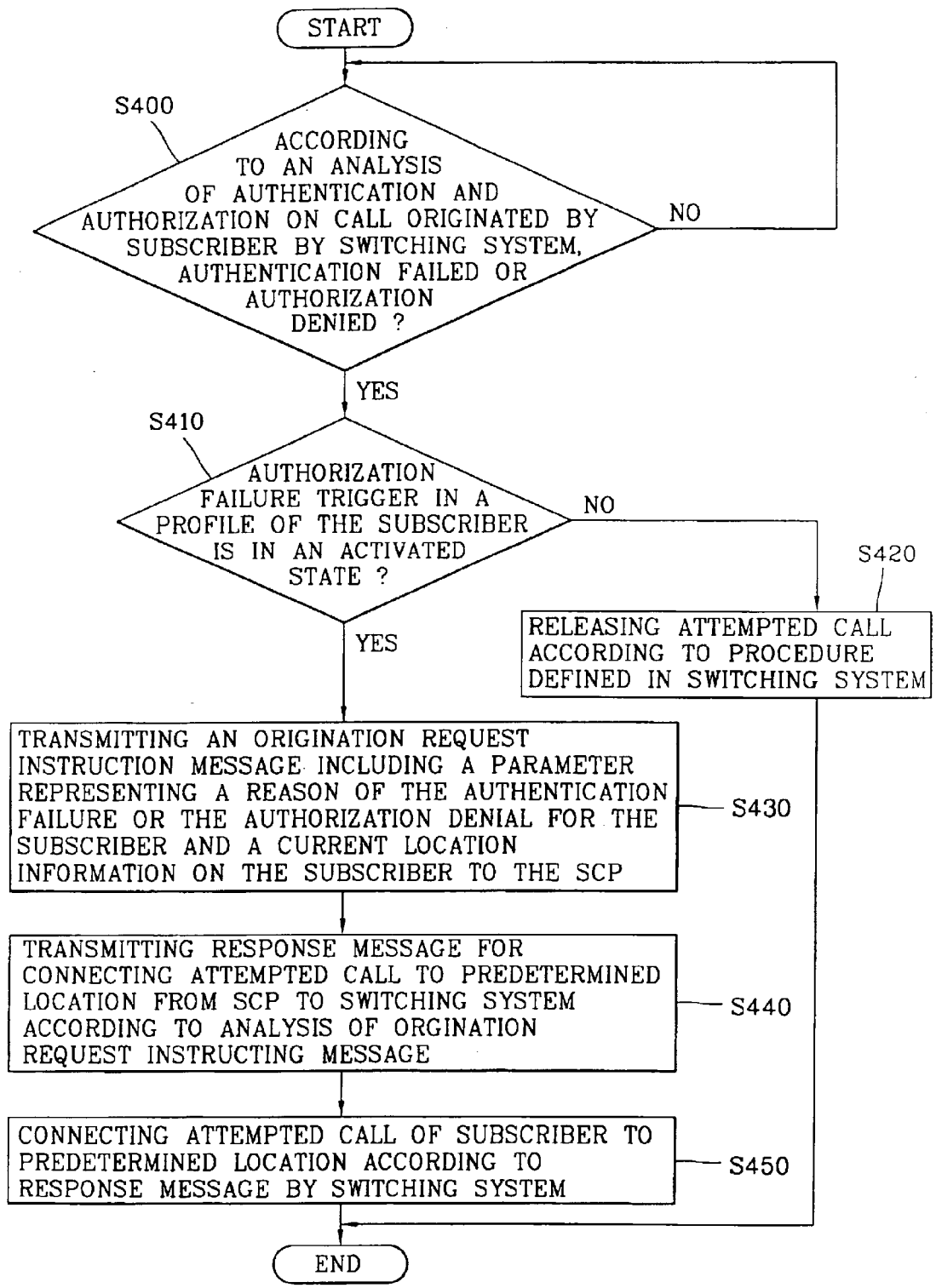
FIG. 5 is a flow chart of a method for processing of an authentication-failed or an authorization-failed subscriber in a communication network service in accordance with a preferred embodiment of the present invention.

FIG. 5 is a flow chart of a method for processing an authentication-failed or an authorization-denied subscriber in a communication network service in accordance with a preferred embodiment of the present invention. The steps of the method of FIG. 5 will be referred to throughout the specification as appropriate.

The preferred embodiment preferably includes a detection point for informing of an authentication failure or an authorization denial for an originated call as it occurs in an intelligent network standard of BCSM, collecting and analyzing information on the originated call according to an instruction from a Service Control Point (SCP), and selecting a route for setting up a call. If the subscriber who attempts to originate a call is authentication-failed or authorization-denied, an authorization failure trigger type is preferably defined to inform the SCP of the situation and execute a processing routine according to an instruction of the SCP.

Figure 6:
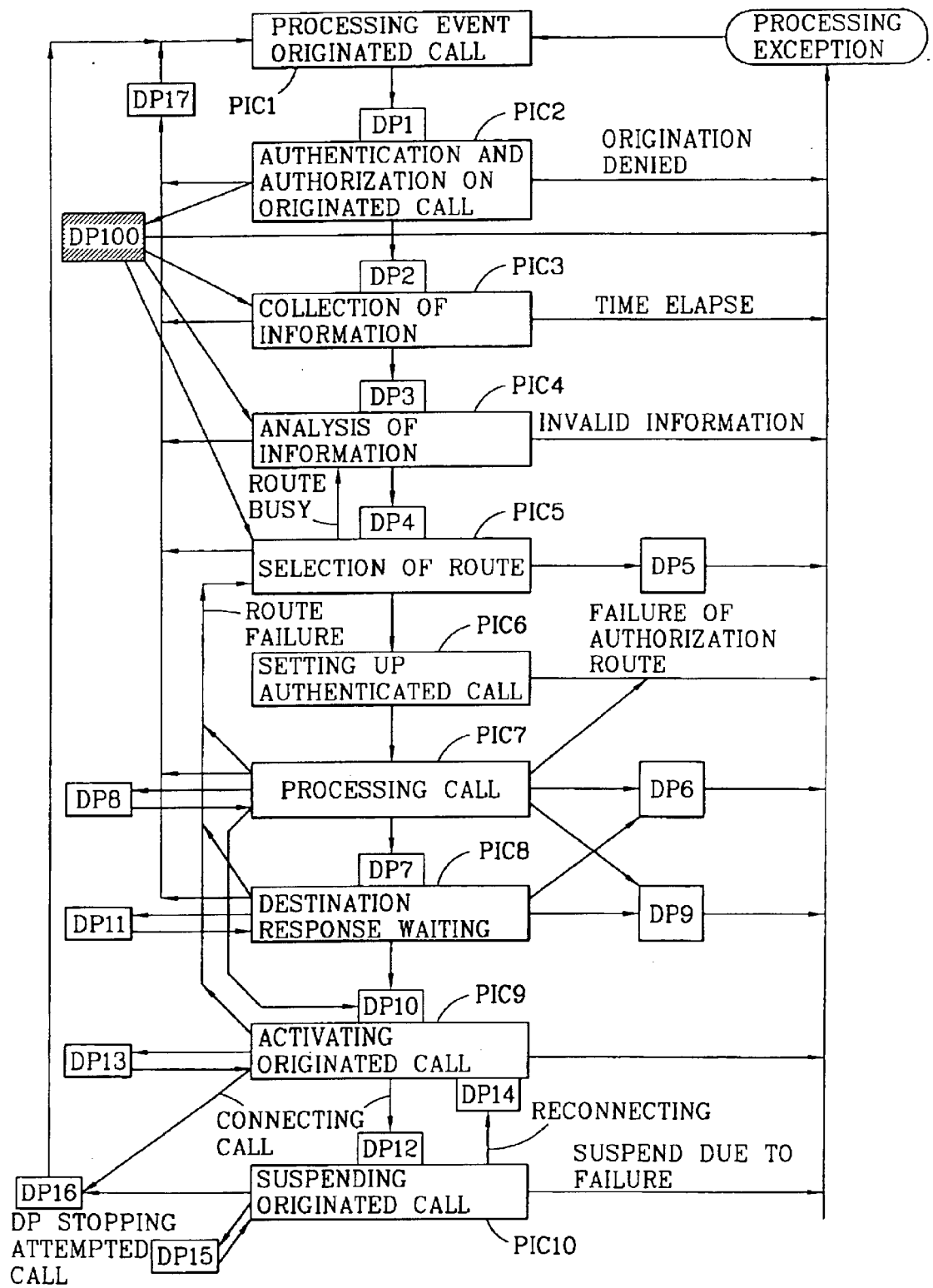
FIG. 6 is a flow chart of a BCSM (Basic Call State Model) showing a process of an originated call according to a WIN (Wireless Intelligent Network) standard in an intelligent network in accordance with a preferred embodiment of the present invention.

FIG. 6 is a flow chart of a BCSM (Basic Call State Model) showing a process of an originated call in a mobile communication intelligent network of the North America in accordance with a preferred embodiment of the present invention. The process preferably relates to a WIN (Wireless Intelligent Network).

First, as shown in the FIG. 6, when an authentication fails or an authorization is denied for an attempted call during processing in a BCSM defined in a mobile communication intelligent network of a North American wireless standard, which is preferably a WIN standard, a detection point DP100 detects and reports it to the SCP and sequentially processes information collection, information analysis, and call set-up route selection according to the instructions of the SCP. The transition in the detection point DP100 is preferably defined as shown in Table 1.

TABLE 1

| From | To | Nature of BCSM Transition | Remark |
|---|---|---|---|
| Origination_Attempt_Unauthorized DP | O-Exception | Basic | Newly defined |
| | Collected_Information PIC | Extended | |
| | Analyze_Information PIC | Extended | |
| | Select_Route PIC | Extended | |
| Authorize_Origination_Attempt PIC | Origination_Attempt_Authorized DP | | Existing standard |
| | O_Abandon | | |
| | O_Exception DP | Basic | |
| | Origination_Attempt_Unauthorized DP | Basic | Newly defined |

The Origination_Attempt_Unauthorized DP determined whether or not the authorization failure trigger at the detection point DP 100, as defined in Table 1, is to be activated. When other conditions are satisfied in a state that the trigger is activated, the Origination_Attempt_Unauthorized DP performs triggering. The authorization failure trigger is given by subscribers, and a trigger is applied to a call originated by a mobile communication subscriber. The authorization-failure trigger type is set as a reference trigger type for detecting a trigger condition in which a service switching function and a call controlling function are effective at the Origination_Attempt_Unauthorized DP.

When a disturbance occurs so that the SCP is not able to respond, the corresponding attempted call is terminated or routed to a predetermined place, or is processed as a normal call.

Meanwhile, when the triggering condition is satisfied, an origination request instruction on a TIA/EIA-41 is performed. The condition for informing the SCP of the fact that the Origination_Attempt_Unauthorized DP is met is given by a subscriber profile.

An operation for processing an attempted call, when the detection point DP100 is applied to the BCSM according to the WIN standard, is described next.

Referring to FIG. 6, when a call originating from a terminal is detected by a Point In Call 1 (PIC1), PIC1 performs an event processing for the detected call and the next step is performed for an intelligent network service.

A Point In Call 2 (PIC2) performs an authenticating procedure and checks an authorization of the terminal to determine whether the call has been received from a normal subscriber terminal. If the call is determined to have been received from a normal subscriber terminal and authentication and authorization have been given, the general procedures as described above are performed, detailed information of which is thus omitted.

Meanwhile, if authentication has failed or if authorization has been denied for the subscriber terminal that attempted the call in the Point In Call 2 (PIC2), corresponding information is preferably detected by the detection point DP100. Then, the detection point DP100 reports the information on the authentication-failed or authorization-denied subscriber to the SCP according to the authorization failure trigger type, which is defined as described above.

Thereafter, for the authentication-failed or the authorization-denied call, the DP100 performs an information collection processing through the Point In Call 3 (PIC3), analyzes information through the Point In Call 4 (PIC4), or performs a route selection processing to set up a call through the Point In Call 5 (PIC 5), according to the content of the instruction of the SCP. Thus, the originated call can be connected to a phone number assigned by a legitimate subscriber, or can be connected to a special service equipment such as an IP, or can be subjected to a normal call processing.

In this way, an identification of the corresponding subscriber, determination of the user's legitimacy and a voice announcement service, or the normal call set-up service is provided.

Figure 7:
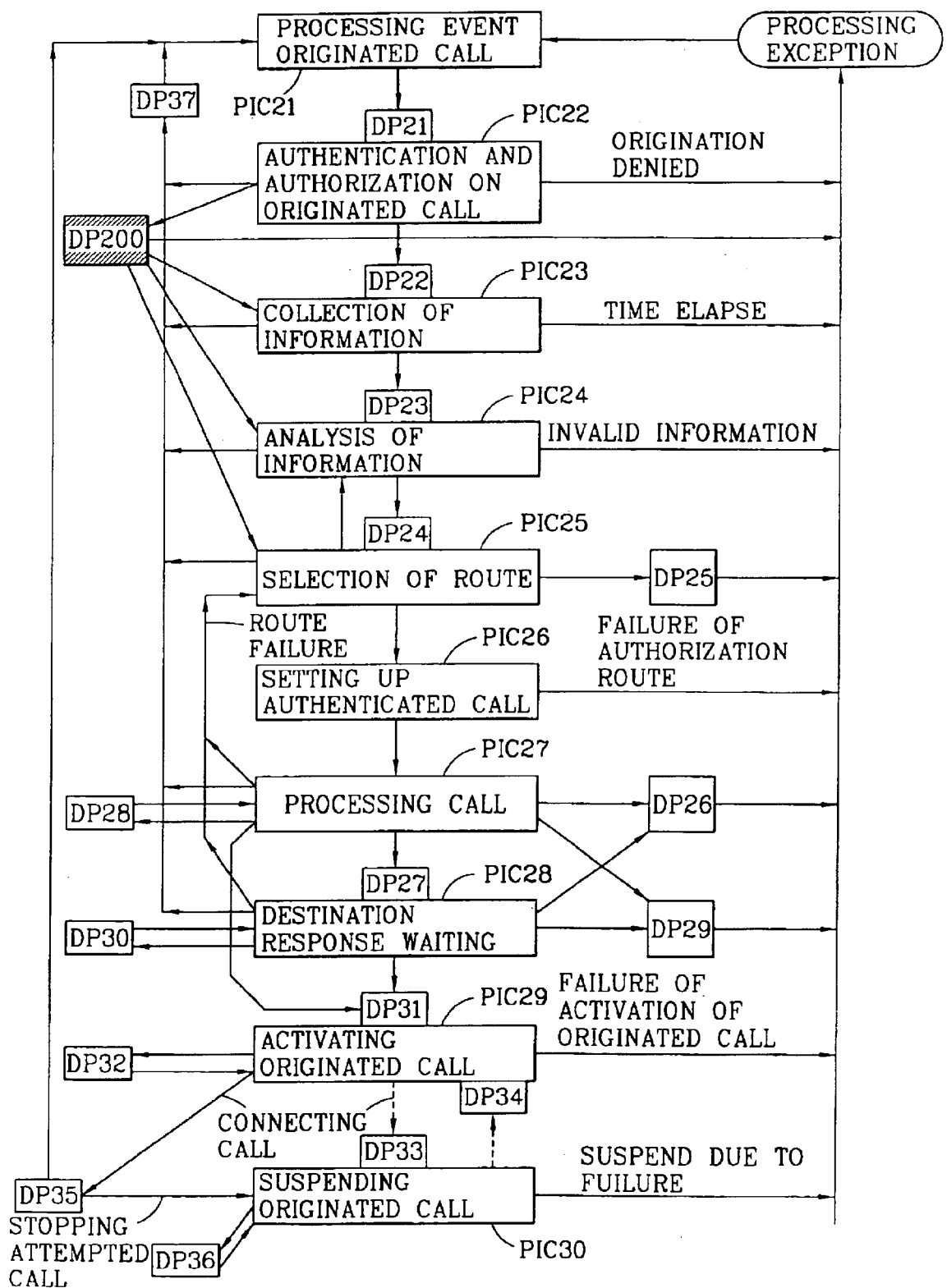
FIG. 7 is a flow chart of a BCSM (Basic Call State Model) showing a process of an originated call according to a ITU-T standard in an intelligent network in accordance with a preferred embodiment of the present invention.

FIG. 7 is a flow chart of a Basic Call State Model showing a process of an originated call according to a ITU-T standard in an intelligent network in accordance with a preferred embodiment of the present invention.

As shown in FIG. 7, when an attempted call fails for authentication or is denied for authorization in the BCSM defined in the ITU-T standard, a detection point (DP200) preferably reports the authentication failure or the authorization denial to the SCP. Detection Point (DP200) also collects information on the corresponding originated call, analyzes the information, and selects a route for setting up the call. The shifting in the detection point (DP200) is preferably defined as shown in below Table 2.

TABLE 2

| From | To | Nature of BCSM Transition | Remark |
|---|---|---|---|
| Origination_Attempt_Unauthorized DP | O_Exception | Basic | Newly defined |
| | Collected_Information PIC | Extended | |
| | Analyze_Information PIC | Extended | |
| | Select_Route PIC | Extended | |
| Authorized_Origination_Attempt PIC | Origination_Attempt_Authorized DP | Basic | Existing standard |
| | O_Abandon | Basic | |
| | O_Exception DP | Basic | |
| | Origination_Attempt_Unauthorized DP | Basic | Newly defined |

An Origination_Attempt_Unauthorized DP preferably determines whether or not the authorization failure trigger at the detection point DP 200 as defined in Table 2 is to be activated. When other conditions are satisfied while the trigger is activated, the Origination_Attempt_Unauthorized DP performs triggering. The authorization failure trigger is preferably given by subscribers. A trigger is applied to a mobile communication subscriber, a non-ISDN wired subscriber, a BRI service profile, a BRI matching, and a PRI matching. The authorization-failure trigger type is set as a reference trigger type for detecting a trigger condition in which a service switching function and a call controlling function are effective at the Origination_Attempt_Unauthorized DP.

If a disturbance occurs so that the SCP is not able to respond, the corresponding attempted call is terminated or routed to a predetermined place, or is processed as a normal call.

An operation for processing an attempted call, where the detection point DP200 is applied to the BCSM (Basic Call State Model) according to the ITU-T standard, is described next.

When a call originating from a terminal is detected by a Point In Call 21 (PIC21), the PIC2 performs an event processing for the detected call and the next step is performed for an intelligent network service.

A Point In Call 22 (PIC22) performs an authenticating procedure and checks an authorization of the terminal to determine whether the call has been received from a normal subscriber terminal. If the call is determined to have been received from a normal subscriber terminal and authentication and authorization have been given, the general procedures as described above are performed, detailed information of which is thus omitted.

Meanwhile, if authentication has failed or if authorization has been denied for the subscriber terminal that attempted the call in the Point In Call 22 (PIC22), corresponding information is preferably detected by the detection point (DP200). Then, the detection point (DP200) reports the information on the authentication-failed or authorization-denied subscriber to the SCP, according to the authorization failure trigger type, which is defined as described above.

Thereafter, for the authentication-failed or the authorization-denied call, the detection point DP200 performs an information collection process through the Point In Call 23 (PIC23), performs an information analyzing process through the Point In Call 24 (PIC24), or performs a route selection process to set up a call through the Point In Call (PIC25), according to the content of the instruction of the SCP. Thus, the originated call can be connected to a phone number assigned by a legitimate subscriber, or can be connected to special service equipment, such as an IP, or can be subjected to a normal call processing.

In this way, the identification of the corresponding subscriber, determination of the user's legitimacy and voice announcement service, or the normal call set-up service are provided.

Figure 8:
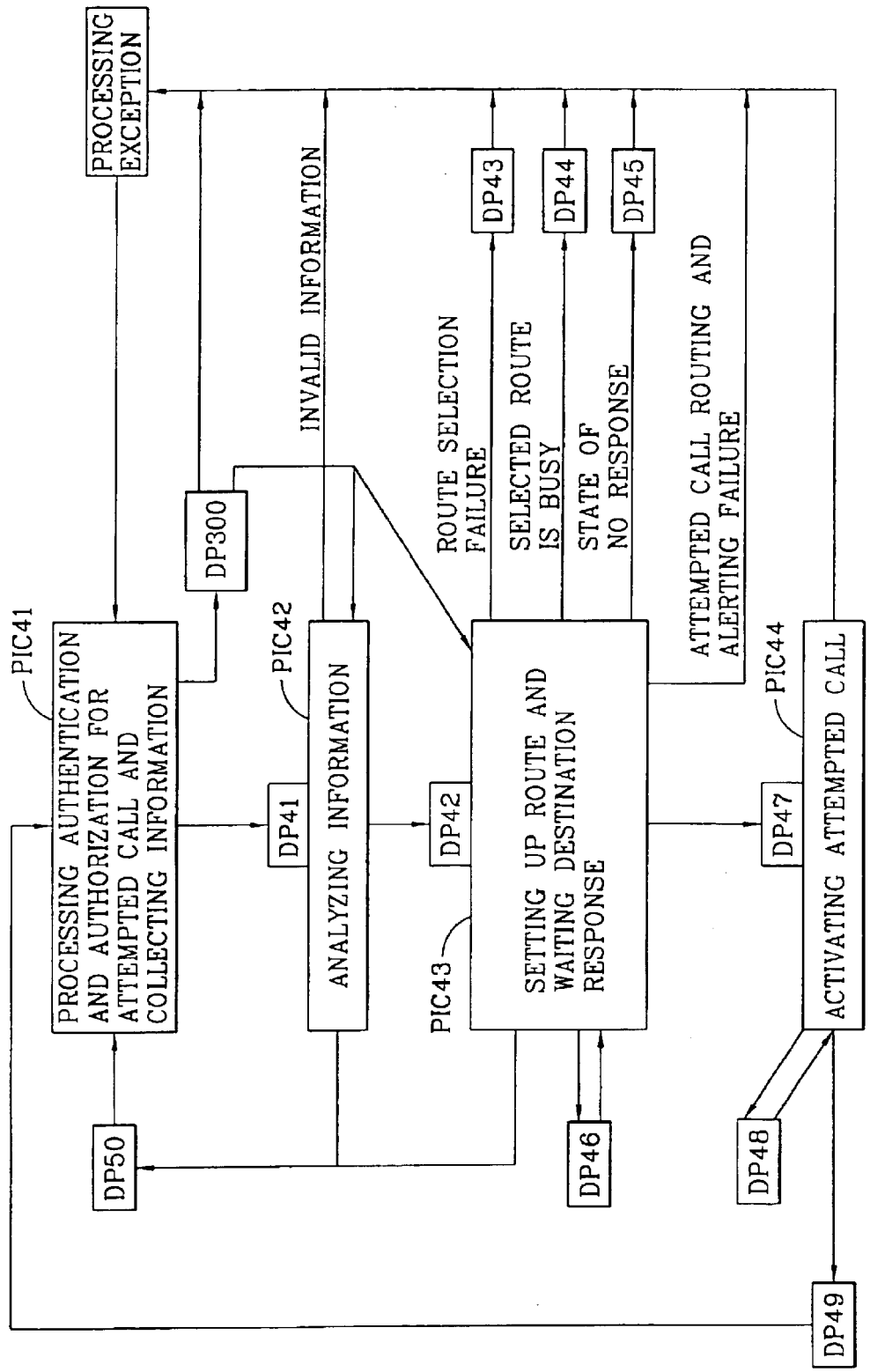
FIG. 8 is a flow chart of a BCSM (Basic Call State Model) showing a process of an originated call according to a CAMEL standard in an intelligent network in accordance with a preferred embodiment of the present invention.

FIG. 8 is a flow chart of a Basic Call State Model showing a process of an originated call in an intelligent network of GSM/UMTS, in accordance with a preferred embodiment of the present invention.

As shown in FIG. 8, when an attempted call has failed for authentication or has been denied for authorization in the BCSM defined in the intelligent network of GSM/UMTS, preferably using the CAMEL standard, a detection point DP300 is preferably included to report the authentication failure or the authorization denial to the SCP. The detection point (DP300) also preferably collects information on the corresponding originated call, analyzes the information, and selects a route for setting up a call. The shifting in the detection point DP300 is defined as shown in below Table 3.

TABLE 3

| From | To | Nature of BCSM Transition | Remark |
|---|---|---|---|
| Origination_Attempt_Unauthorized DP | O_Exception | Basic | Newly defined |
| | Analyze_Information PIC | Extended | |
| | Select_Route and destination response waiting PIC | Extended | |
| Authorized_Origination_Attempt and collected_Information PIC | Collected_Information DP | Basic | Existing standard |
| | Origination_Attempt_Unauthorized DP | Basic | Newly defined |

An Origination_Attempt_Unauthorized DP preferably determines whether or not the authorization failure trigger at the detection point DP 300 as defined in Table 3 is to be activated. When other conditions are satisfied when the trigger is activated, the Origination_Attempt_Unauthorized DP performs triggering. The authorization failure trigger is preferably given by subscribers, and a trigger is applied to a call originated by a mobile communication subscriber. The authorization-failure trigger type is set as a reference trigger type for detecting a trigger condition in which a service switching function and a call controlling function are effective at the Origination_Attempt_Unauthorized DP.

If a disturbance occurs so that the SCP is not able to respond, the corresponding attempted call is terminated or routed to a predetermined place, or is processed as a normal call.

The operation for processing an attempted call, when the detection point DP300 is applied to the Basic Call State Model according to the CAMEL standard, described next.

When an event for an attempted call is detected by the Point In Call (PIC41), the PIC41 analyzes the authentication and authorization of the call and collects initial information on the call.

Upon analyzing the authentication and authorization, when the call is successfully given an authentication and authorization, general operations such as request for analysis on the collected information, routing of the attempted call, and activation of the attempted call can be performed.

Upon analyzing the authentication and authorization, if the call has failed for authentication or has been denied for authorization, corresponding information is detected by the detection point DP300.

The detection point DP300 then reports the information on the corresponding call subscriber to the SCP according to the trigger type defined as described above. It then proceeds to the PIC42 to analyze the information on the call, or the PIC43 to perform routing for setting up a call and destination response waiting for the call, according to the instruction of the SCP. Thus, the originated call can be connected to a phone number assigned by a legitimate subscriber, or can be connected to a special service equipment such as an IP, or can be subjected to a normal call processing. In this way, the identification of the corresponding subscriber, determination of the user's legitimacy and voice announcement service, or the normal call set-up service can be provided.

A procedure of a service for setting up a call when an authentication failure and/or authorization denial have been detected in accordance with the present invention will now be described. First, a service procedure for an attempted call in an intelligent network of the North American will now be described with reference to FIGS. 5, 9A, and 9B.

FIGS. 9A and 9B are a flow chart depicting a call connection service between a terminal and a switching system where an originated call is authentication-failed or authorization-denied in the communication network service of the WIN standard in accordance with a preferred embodiment of the present invention, First, in a mobile communication service network, when a call originating from a terminal 10 is detected by the MSC/VLR 20 (S501). The MSC/VLR 20 then performs authentication on the detected call using an authentication request message received from an HLR (not shown) or an authentication center (S502).

If the MSC/VLR 20 fails to authenticate the terminal that originated the call, or the MSC/VLR fails to authorize the subscriber for some reason, the Origination_Attempt_Unauthorized detection point detects that (S503)(S400).

Next, in the Origination_Attempt_Unauthorized detection point, when an authorization failure trigger (Authorization_Failure Trigger) is not in an activated state in the profile of the originating call subscriber, the MSC/VLR 20 transmits an appropriate announcement to the terminal 10 that attempted the call. It then releases the call and every resource (S504) (S410, S420). The appropriate announcement is preferably provided by the MSC/VLR.

Meanwhile, if the authorization failure trigger is in an activated state in the profile of the originating call subscriber, the MSC/VLR 20 transmits an origination request instruction message (OriginationRequest INVOKE message) to the SCP 30 that handles the corresponding trigger (S505)(S430). The origination request instruction message preferably includes a parameter representing a reason of the authentication failure or the authorization denial for the subscriber and current location information on the subscriber.

The SCP 30 preferably analyzes the reason for the authentication failure or the authorization denial of the subscriber terminal 10 that attempted the call and the location information of the corresponding terminal 10 of the received call origination request instructing message (OriginationRequest INVOKE message). This is done based on the subscriber profile, and the history of authentication failures and the authorization denial. The SCP 30 also stores necessary matter, and selects the next routine for performing.

Specifically, if the SCP 30 determines that the attempted call of the corresponding subscriber terminal 10 has to (A) be connected with an operator of a service center that handles the corresponding authentication failure or the authorization denial or (B) be connected with a phone number assigned by the legitimate subscriber of the corresponding terminal 10, the SCP 30 preferably includes (A) a routing number for routing to the service center that handles the corresponding authentication failure or the authorization denial or (B) the phone number assigned by the legitimate subscriber of the corresponding terminal 10, in the origination request return result message (OriginationRequest RETURN RESULT message). The SCP 30 also selectively includes the content that the Calling Party Number is to be provided to the called party in the OriginationRequest RETURN RESULT message. Then, the SCP 30 transmits the OriginationRequest RETURN RESULT message to the MSC/VLR 20 (S508).

If, on the other hand, the SCP 30 determines that the subscriber terminal 10 that attempted a call is to be connected to the IP 50 so that it can be informed of a specific voice announcement, and if a routing number to the IP 50 for transmitting the specific voice announcement is known, the SCP 30 includes the corresponding routing number in the origination request return result message (OriginationRequest RETURN RESULT message) and transmits it to the MSC/VLR 20 (S508).

When, however, the SCP 30 determines that the subscriber terminal 10 that attempted a call is to be connected to the IP 50 so that it can be informed of a specific voice announcement, and a routing number for routing to the IP 50 for transmitting the specific voice announcement is not known, the SCP 30 preferably requests a resource seizure instruction from the IP 50 for providing the specific voice announcement to the corresponding subscriber who attempted the call (S506). The SCP 30 receives the resource seizure return result message carrying a TLDN (Temporary Local Directory Number) for accessing the announcement from the IP 50 (S507), and includes the TLDN in the OriginationRequest RETURN RESULT message and transmits it to the MSC/VLR 20 (S508).

Next, if the SCP 30 determines that the attempted call by the subscriber is to be processed as a normal call, the SCP 30 preferably transmits the OriginationRequest RETURN RESULT message carrying a parameter instructing proceeding of the normal call to the MSC/VLR 20 (S508). The message may include a parameter instructing the transmission of a specific announcement provided in the MSC.

Meanwhile, if the SCP 30 determines that call processing is to be stopped and every resource is to be retrieved, the SCP 30 includes a content instructing stoppage of processing of the call in the origination request return result message and transmits it to the MSC/VLR 20 (S508).

The MSC/VLR 20 then performs an appropriate connection for the authentication-failed or authorization-denied call according to the origination request return result message received from the SCP 30.

If the origination request return result message received from the SCP 30 contains instructions to connect to a specific routing number or a destination number, and if the instruction is to set up a call to a phone number of the specific operator of the service center or to a phone number that has previously been assigned by a legitimate subscriber of the corresponding terminal 10, the MSC/VLR 20 connects the call originating from the terminal 10 to the service center or to a previously assigned subscriber 40 (509).

If, however, the instruction is to set up a call to the IP 50, the MSC/VLR 20 sets up a call between the call originating from the terminal 10 and the IP 50 (S510). Next, if the instruction is to perform a normal call process, the MSC/VLR 20 connects the calling party and the called party 60 (S511).

Finally, if the instruction is to stop call processing for the corresponding originating call, the MSC/VLR 20 releases the corresponding originating call (S512).

In step 509, if the MSC/VLR 20 sets up a call to the operator of the service center that handles the authentication failure or the authorization denial, the service center checks an identification of the subscriber who attempted the call and determines his or her legitimacy.

If he or she is determined to be disqualified, the service center leads him or her to retrieval of the terminal and guides him or her to a normal service, or determines whether the service should be disconnected against the corresponding subscriber. It then records the corresponding content to reflect it in the service profile as required.

If the subscriber delays payment of a service fee, the subscriber is preferably informed of the corresponding matter through a voice announcement to guide him or her to a normal service.

If the authentication has failed or the authorization has been denied even though the subscriber is qualified, a measure is taken to normalize the service for the corresponding subscriber as early as possible or a necessary announcement service is provided to the subscriber.

When the MSC/VLR 20 sets up a call to a phone number that has previously been assigned by a legitimate subscriber for the attempted call by the subscriber, the previously assigned called party confirms the identification of the calling party so that the terminal can be retrieved.

In step 510, when a call is connected between the MSC/VLR 20 and the IP 50, the IP 50 preferably transmits a voice announcement corresponding to the destination routing number to the subscriber, and when the announcement is completely transmitted, the set-up call is preferably ended.

In step 511, the MSC/VLR 20 sets up a call to the number called by the subscriber for the authentication-failed or authorization-denied call, and provides a normal service.

If the SCP 30 receives the origination request instructing message, including the parameter indicating the reason of the authentication failure or the authorization denial for the subscriber and the current location information of the subscriber from the MSC/VLR 20, and if the SCP 30 connects a call originating from the subscriber with the service unit such as the IP 50, the subscriber and the service unit are mutually operated to each other. At this time, if the SCP 30 determines that a special service is to be performed, the SCP 30 requests a resource seizure instruction from the IP 50 to perform the special service.

Upon receiving the seize resource instruction from the SCP 30, the IP 50 transmits the resource seizure return result message carrying the TLDN that provides access to the assigned resource, to the SCP 30 (S514).

Then, in accordance with the TLDN includes in the resource seizure return result message, the SCP 30 transmits a message to the MSC/VLR 20 instructing the resource connection (S515). The MSC/VLR 20 this sets up a call between the terminal 10 that originated the call and the IP 50, by using the TLDN.

When the call is set up between the terminal 10 and the IP 50, the IP 50 detects the connection of the call to the TLDN assigned for a resource for performing a special service, informs the SCP 30 of it, and transmits a command request instructing message (Instruction Request RETURN RESULT message) to the SCP 30, to request information as to what process is to be performed for the corresponding call (S517).

According to the command request instruction message, when the SCP 30 transmits the specific resource function command instructing message for a content instructing an operation for an assigned resource to the IP 50 (S518), the IP 50 performs an operation as instructed by the special resource function command instructing message for the assigned resource in association with the call-originating subscriber (S519).

When the mutual operation between the call-originating subscriber and the IP 50 is terminated, the IP 50 transmits a special resource function command return result including information on the result, to the SCP 30.

Then, the SCP 30 includes the content of the special resource function command return result in the origination request return result message, and transmits it to the MSC/VLR 20 (S521). The SCP30 also transmits the command request return result to the IP 50 (S522).

Upon receiving the instruction of the origination request return result message from the SCP 30, the MSC/VLR 20 either sets up a new call or releases a call (S523, S524) (S440, S450).

A service procedure for an attempted call according to the ITU-T standard in accordance with a second preferred embodiment of the present invention will now be described with reference to FIGS. 5, 10A, and 10B.

FIGS. 10A and 10B are a flow chart illustrating a call connection service between a terminal and a switching system when an originated call is subject to an authentication failure or an authorization denial in the communication network service of the ITU-T standard.

In a mobile communication service network, when a call originating from a terminal 10 is detected by a switching system/SSP 20A (S601), the switching system/SSP 20A performs authentication on the detected call (S602).

If the switching system/SSP 20A fails to authenticate the terminal that originated the call, or if the switching system/SSP 20A fails to authorize the subscriber for some reason, the Origination_Attempt_Unauthorized detection point (S503) (S400) detects that. (S603)(S400).

In the Origination_Attempt_Unauthorized detection point, if an authorization failure trigger is not in an activated state in the profile of the originated call subscriber, the switching system/SSP 20A transmits an appropriate announcement to the terminal 10 which attempted the call, and releases the call and every resource (S604) (S410, S420). The appropriate announcement is preferably provided by the MSC/VLR.

Meanwhile, if the authorization failure trigger is in an activated state in the profile of the originated call subscriber, the switching system/SSP 20A transmits an initial detection point message (Initial DP message) to the SCP 30 that handles the corresponding trigger (S605)(S430). The initial DP message preferably includes a parameter representing a reason of the authentication failure or the authorization denial for the subscriber, and selectively, current location information on the subscriber.

The SCP 30 preferably analyzes the reason for the authentication failure or the authorization denial of the subscriber terminal 10 that attempted the call and the location information of the corresponding terminal 10 of the received call origination request instructing message. This is done based on the subscriber profile and the history of authentication failures and the authorization denial. The SCP30 also stores necessary matter, and selects the next routine for performing.

If the SCP 30 determines that the attempted call of the corresponding subscriber terminal 10 is to be (A) connected with an operator of a service center that handles the corresponding authentication failure or the authorization denial or (B) connected with a phone number assigned by the legitimate subscriber of the corresponding terminal 10, the SCP 30 transmits (A) a connection message including the routing number to the operator of the service center that handles the corresponding authentication failure or the authorization denial or the phone number assigned by the legitimate subscriber of the corresponding terminal 10 to the switching system/SSP 20A.

Meanwhile, if the SCP 30 determines that the subscriber terminal 10 that has attempted a call is to be connected to the IP 50 so that it can receive a specific voice announcement, the SCP 30 includes the routing number to the IP 50 that transmits the special voice announcement in the connection message, and transmits it to the switching system/SSP 20A (S606).

The switching system/SSP 20A preferably performs a corresponding operation according to the instruction of the connection message from the SCP 30.

If it instructs a connection to a specific routing number or a destination number, if it is an instruction to set up a call to a phone number of the specific operator of the service center or a phone number that is previously assigned by a legitimate subscriber of the corresponding terminal 10, the switching system/SSP 20A sets up a call between the call-originating subscriber and the service center or between the call-originating subscriber and the previously assigned destination 40 (S607).

Meanwhile, if is an instruction to set up a call to the IP 50, the switching system/SSP 20A sets up a call between the call-originating subscriber and the IP 50 (S608).

If the SCP 30 determines that the call originating from the subscriber is to be processed as a normal call and thus transmits a related message to the switching system/SSP 20A, the called party 60 of the phone number called by the call-originating subscriber is called. A call is thus set up between the call-originating subscriber and the called party 60 and communication is established (S609)(S610).

If the SCP 30 determines that call processing is to be stopped and every resource is to be retrieved, the SCP transmits a call release message to the switching system/SSP 20A (S611).

As described above, if the switching center/SSP 20A sets up a call to the operator of the service center that handles the authentication failure or the authorization denial, the service center checks identification of the subscriber who attempted the call, and determines his or her legitimacy.

If he or she is determines to be a disqualified user, the service center leads him or her to retrieval of his or her terminal and guides him or her to a normal service. Alternatively, it determines whether the service is to be disconnected against the corresponding subscriber, and then records the corresponding content to reflect it in the service profile as required.

If the subscriber delays payment of a service fee, the subscriber is informed of the situation through a voice announcement to guide him or her to a normal service. If the authentication has failed or the authorization has been denied, even though the subscriber is qualified, a measure is taken to normalize the service for the corresponding subscriber as quickly as possible, or a necessary announcement service is provided to the subscriber.

When a call is set up to a phone number that has previously been assigned by a legitimate subscriber for the attempted call by the subscriber, the previously assigned called party confirms the identification of the calling party so that the terminal can be retrieved.

In order to provide a special service to the call-originating subscriber by using the resource of the IP 50, the SCP 30 preferably transmits a resource connection message carrying address information for the corresponding special IP resource to the switching system/SSP 20A (S613). At the same time, the SCP30 transmits a message requesting an announcement transmission to the IP 50 (S614).

The switching system/SSP 20A then sets up a call to the address of the IP 50 assigned by the SCP 30 in the resource connection message, and the specific service procedure is performed by the mutual operation between the IP and the call-originating subscriber (S615) (S440, S450).

In a third different embodiment, a service procedure for an attempted call according to the CAMEL standard will now be described with reference to FIGS. 5, 11A, and 11B.

FIGS. 11A and 11B illustrate a call connection service between a terminal and a switching system when the originating call is subject to an authentication failure or an authorization denial in the communication network service of the CAMEL standard.

In a mobile communication service network, when a call originating from a terminal 10 is detected by an MSC/VLR/gsmSSF 20C (S701), the MSC/VLR/gsmSSF 20C performs an authentication on the detected call (S702). If the MSC/VLR/gsmSSF 20C fails to authenticate the terminal that originated the call or the MSC/VLR/gsmSSF 20C fails to authorize the subscriber for some reason, the Origination_Attempt_Unauthorized detection point detects that (S703) (S400).

In the Origination_Attempt_Unauthorized detection point, when an authorization_Failure Trigger is not in an activated state in the profile of the originated call subscriber, the MSC/VLR/gsmSSF 20C transmits an appropriate announcement, that is provided in itself, to the terminal 10 that attempted the call, and releases the call and every resource (S704) (S410, S420). The appropriate announcement is preferably provided by the MSC/VLR.

Meanwhile, if the authorization failure trigger is in an activated state in the profile of the originating call subscriber, the MSC/VLR/gsmSSF 20C transmits an initial detection point message to the SCP 30 that handles the corresponding trigger (S705)(S430). The initial detection point message preferably includes a parameter representing a reason for the authentication failure or the authorization denial for the subscriber and selectively current location information on the subscriber.

The SCP 30 preferably analyzes the reason for the authentication failure or the authorization denial of the subscriber terminal 10 that attempted the call and the location information of the corresponding terminal 10 of the received call origination request instructing message. This is done based on the subscriber profile and the history of authentication failures and the authorization denial. The SCP30 also stores a necessary matter, and selects the next routine to perform.

If the SCP 30 determines that the attempted call of the corresponding subscriber terminal 10 be (A) connected with an operator of a service center that handles the corresponding authentication failure or the authorization denial or (B) connected with a phone number assigned by the legitimate subscriber of the corresponding terminal 10, the SCP 30 transmits (A) a connection message including the routing number to the operator of the service center that handles the corresponding authentication failure or the authorization denial (B) or the phone number assigned by the legitimate subscriber of the corresponding terminal 10 to the switching system/SSP 20A.

Meanwhile, if the SCP 30 determines that the subscriber terminal 10 that attempted a call is to be connected to the IP 50 so that it can be informed of a specific voice announcement, the SCP 30 includes the routing number to the IP 50 that transmits the special voice announcement in the connection message, and transmits it to the MSC/VLR/gsmSSF 20C (S706).

At this time, the MSC/VLR/gsmSSF 20C preferably performs a corresponding operation according to the instruction of the connection message from the SCP 30.

If the instruction indicates that a connection be set up to a specific routing number or a destination number, if it is an instruction to set up a call to a phone number of the specific operator of the service center or a phone number that is previously assigned by a legitimate subscriber of the corresponding terminal 10, the MSC/VLR/gsmSSF 20C sets up a call between the call-originating subscriber and the service center or between the call-originating subscriber and the previously assigned destination 40 (S707).

Meanwhile, if it is an instruction to set up a call to the IP 50, the MSC/VLR/gsmSSF 20C sets up a call between the call-originating subscriber and the IP 50 (S708).

In order to provide a special service to the call-originating subscriber by using the resource of the IP 50, the SCP 30 preferably transmits a resource connection message carrying address information on the corresponding special IP resource to the MSC/VLR/gsmSSF 20C (S713), and at the same time, transmits a message requesting an announcement transmission to the IP 50 (S714).

The MSC/VLR/gsmSSF 20C then sets up a call to the address of the IP 50 assigned by the SCP 30 in the resource connection message, and the specific service procedure is performed by the mutual operation between the IP and the call-originating subscriber (S715) (S440, S450).

The method for processing authorization failed/authorization denied subscribers by intelligent network according to the preferred embodiments of the present invention has many advantages. For example, the call originating from a subscriber for authentication is denied for authorization, an effective measure is taken and various services are provided. Additionally, an illegally copied and used terminal is detected to thereby protect the legitimate subscriber from damage. Also, a lost or stolen terminal can be retrieved and returned to its owner.

In addition, an effective announcement service is provided to the authorized-denied subscriber, and a payment delay situation can be informed to the subscriber who has delayed a payment for a service fee, leading him or her to a normal service.

Also, if a legitimate subscriber has failed for authentication and is thus not provided a normal service for some reason, the situation can be quickly recognized and a suitable measure can be taken, thereby providing a normal service to the legitimate subscriber.

Moreover, if a call originated by a subscriber for authentication or is denied for authorization, the call can be automatically traced and its history can be automatically maintained. In this manner, for the call originated by an authentication-failed and authorization-denied subscriber, a communication network provider can have various methods, that are suitably adopted according to the situations.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing authorization failed/authorization denied subscribers by an intelligent network, comprising:

analyzing an authentication and authorization of a subscriber originating a call when the call is detected by a mobile switching system;

determining whether an authorization denial trigger is in a state of activation if the subscriber is authorization-denied;

transmitting a voice announcement provided by a switching system and releasing the call if the authorization denial trigger is in a non-activated state, or transmitting an origination request instruction message including a parameter indicating a reason for the authentication failure or the authorization denial against the subscriber and location information of the subscriber, to an SCP if the authorization denial trigger is in an activated state;

transmitting a response message to the switching system to connect the call originated by the subscriber to a prescribed location according to an analysis of the origination request instructing message; and connecting the call originated by the subscriber to a prescribed location according to the response message.

2. The method claim 1, wherein the origination request instruction message comprises an OriginationRequest INVOKE message in an intelligent network of a North American wireless standard.

3. The method of claim 1, wherein the origination request instruction message comprises an Initial Detection Point message in an ITU or a Global System for Mobile/Universal Mobile Telecommunications System (GSM/UMTS).

4. The method of claim 1, wherein the response message comprises an OriginationRequest RETURN RESULT message to connect the call originated by the subscriber to a prescribed location in an intelligent network of a North American wireless standard.

5. The method of claim 1, wherein the response message comprises a Connection message to connect the call originated by the subscriber to a prescribed location in an intelligent network of an ITU or a Global System for Mobile/Universal Mobile Telecommunications.

6. The method of claim 1, wherein when the response message transmitted from the SCP comprises one of (A) a routing number to route to an operator of a service center that handles authentication failure or authorization denial and (B) information corresponding to a phone number assigned by a legitimate subscriber of a corresponding terminal, then the switching system connects the originated call with a corresponding one of a service center and a designated subscriber.

7. The method of claim 1, wherein when the response message transmitted from the SCP comprises information to transmit an announcement with a special purpose, the switching system establishes an originated call with an Intelligent Peripheral assigned in a routing number.

8. The method of claim 1, wherein the switching system establishes the originated call with a receiving subscriber when the response message transmitted from the SCP comprises an instruction to perform a normal call.

9. The method of claim 1, wherein when a routing number of an Intelligent Peripheral (IP) that provides a prescribed announcement and service has not been assigned in the SCP, the SCP transmits a seize resource message to the IP.

10. The method of claim 9, wherein the seize resource message comprises a parameter for the prescribed announcement and service, and wherein the seize resource message causes the SCP to be assigned a resource to access the corresponding announcement and the special service from the IP.

11. A method for processing authentication failed/authorization denied subscribers by intelligent network, comprising:

determining whether an authorization failure trigger for a corresponding subscriber is in an activated state, when an authentication failure or an authorization denial is detected for the subscriber who has originated a call;

sending an origination request to a Service Central Point (SCP) that which handles the corresponding trigger, when the authorization failure trigger is in an activated state;

analyzing the origination request and transmitting a response message to a switching system to connect the call originated by the subscriber to a prescribed location according to the result of the analysis; and connecting the originated call to the prescribed location according to the response message.

12. The method of claim 11, further comprising transmitting a voice announcement provided by the switching system and releasing the originated call, when the authorization failure trigger is in a non-activated state.

13. The method of claim 11, wherein a reason for the authentication failure and the authorization denial included in the origination request, a location information, and a service profile for the subscriber are considered in the analysis of the origination request.

14. The method of claim 11, wherein, the response message comprises one of (A) a routing number to an operator of a service center that handles the authentication failure or authorization denial and (B) information on a phone number designated by a legitimate subscriber of a corresponding terminal.

15. The method of claim 14, wherein the response message comprises the routing number to the operator of the service center that handles the authentication failure or authorization denial when the analysis of the origination request indicates that the SCP is to connect the originated call to the service center, and wherein the response message comprises information on a phone number designated by a legitimate subscriber of a corresponding terminal when the SCP is to connect to a phone number designated by the legitimate subscriber of the corresponding terminal.

16. The method of claim 11, wherein the response message comprises a routing number when the SCP is to transmit a voice announcement having a special purpose, if the routing number to be routed to an Intelligent Peripheral transmitting the voice announcement has been assigned.

17. The method of claim 16, wherein the analysis of the origination request determines whether the SCP is to transmit the voice announcement.

* * * * *